May 24, 1955
F. W. DOLLAR
2,708,897
FUEL LEVEL INDICATOR
Filed May 5, 1953
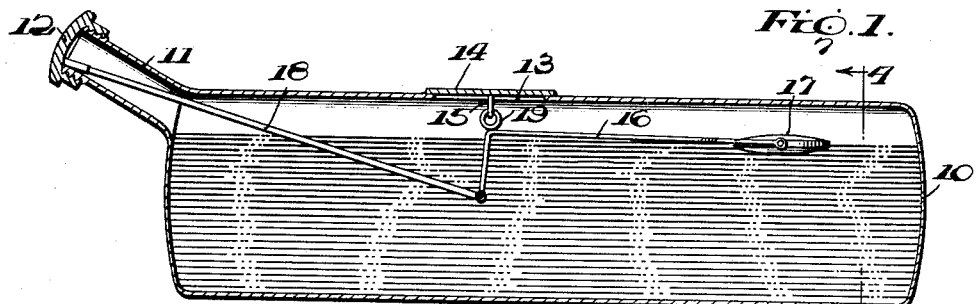
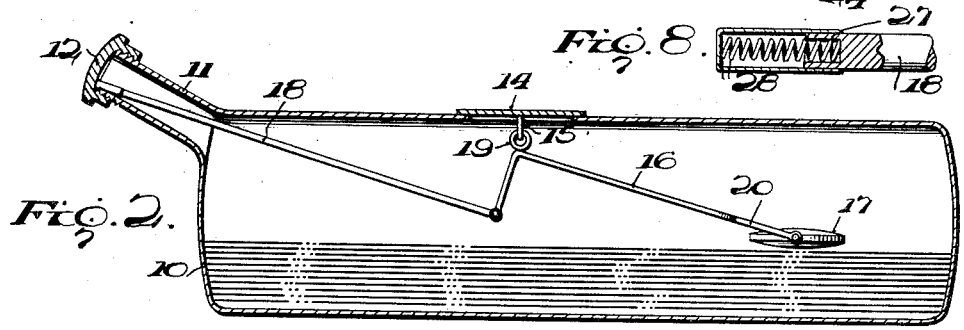
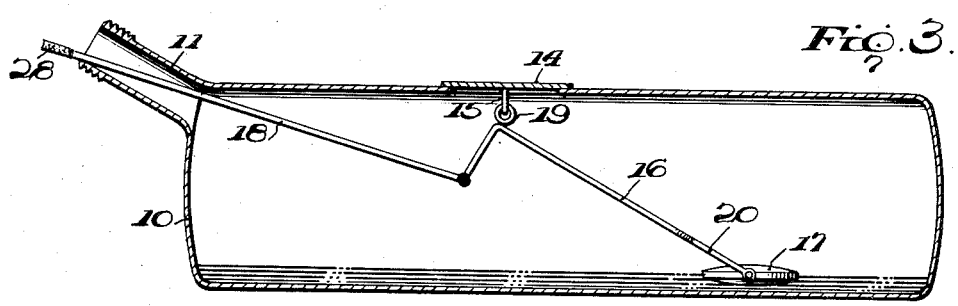
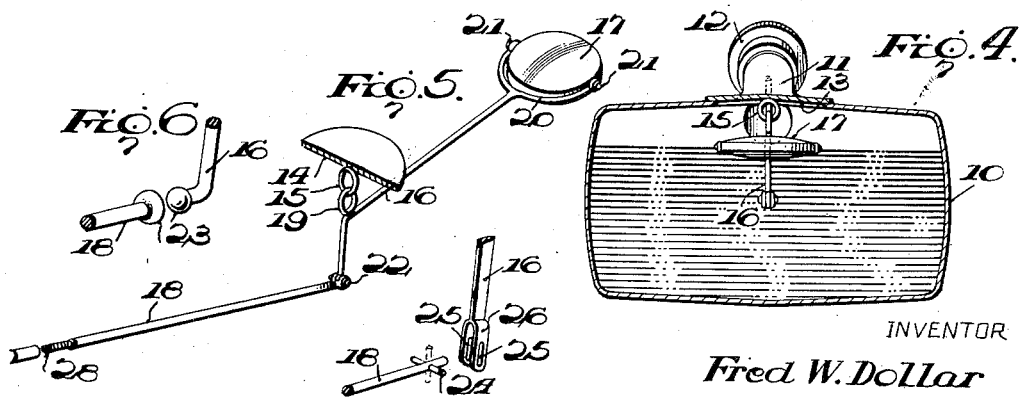
INVENTOR
Fred W. Dollar
BY
ATTORNEY

United States Patent Office 2,708,897
Patented May 24, 1955

2,708,897

FUEL LEVEL INDICATOR

Fred W. Dollar, Henderson, Tex.

Application May 5, 1953, Serial No. 353,247

4 Claims. (Cl. 116—118)

(Granted under Title 35, U. S. Code (1952), sec. 266)

The invention described herein, if patented, may be manufactured and used by or for the Government for governmental purposes without the payment to me of any royalty thereon.

This invention relates to liquid fuel level gauging means.

An object of the invention is to provide a simple device by which an operator can tell even in the dark when a fuel tank is empty or nearly empty, the device having an indicator whose position may be determined by feeling with the hands, and of course may be seen in daylight. Thus the level of liquid fuel in a tank may be ascertained without making a light, which is highly advantageous in logistics.

Another object is to provide a gauging device which may be installed in most fuel tanks without particular difficulty. Further objects are to provide a gauging device which is inexpensive to manufacture and is of rugged construction so that it will not get out of order when subjected to the jars of rough roads.

In the accompanying drawings showing several forms of the invention,

Fig. 1 is a vertical sectional elevation showing a gasoline tank with its filling tube closed by a cap and one embodiment of the invention installed in the tank; the tank being shown nearly full;

Fig. 2 is a similar view showing the tank more than half empty;

Fig. 3 is a similar view showing the tank almost empty and the cap removed;

Fig. 4 is a section on line 4—4 of Fig. 1;

Fig. 5 is a perspective view of the gauging device or indicator;

Fig. 6 is a perspective view of a modified joint which may be used for the gauging device;

Fig. 7 is a perspective view of another modified joint; and

Fig. 8 is an enlarged fragmentary sectional view showing the preferred way of making the outer or free end of the indicator rod.

Referring particularly to the drawings, the tank 10 is of the type having a filling tube 11 extending outwardly and upwardly therefrom at an acute angle to the horizontal, with a cap 12 closing and sealing its open end. An aperture 13 is cut or formed in the top of the tank to permit installation of the gauging device of the invention. To close the aperture 13, a plate 14 is welded to the top of the tank, or if preferred, plate 14 may be made removable by any well known means insuring a tight seal at the top of the tank.

Welded to the underside of plate 14 is a ring 15 providing a suspension means for the gauging device. The gauging device includes a right angularly bent arm 16, a float 17 attached to one end of arm 16, and an indicator rod 18 connected with the other end of arm 16 and lying in the filling tube 11. A ring 19 is welded or otherwise secured to the bent arm 16 at the outside of the right angle and it is split as shown so that it may link with fixed ring 15 and swing freely thereon. Thus the bent arm 16 may move to some extent in all directions. The float 17 is preferably pivotally mounted on the end of bent arm 16 to permit free swinging. As shown, arm 16 has a bifurcated end 20 embracing the float and connected thereto through a pair of aligned pivot pins 21. The float is made of any light material which will float on the liquid in the tank and will not be corroded by the fuel.

It is highly desirable that the bent arm 16 be formed with two lever arms of unequal length, the longer lever arm carrying the float while the shorter-lever arm has a connection at its free end with the indicator rod 18. With the split ring 19 lying in the general plane of the bent arm 16, as illustrated, the bent arm 16 will hang or lie in a generally vertical plane and both its short and long lever arms will be directed downwardly at all times except when the tank is full, at which time the long lever arm will be substantially horizontal and the short lever arm will be substantially vertical (see Fig. 1).

Three different forms of connection between the indicator rod 18 and the bent arm 16 are shown in Figs. 5, 6, and 7. In Fig. 5, the connection is a simple pivotal joint 22, which causes the indicator rod 18 to remain in the vertical plane of the bent arm 16. In Fig. 6 the connection is a simple universal joint 23. Fig. 7 shows a pivot connection wherein the indicator rod has a pivot member 24 projecting from opposite sides near its end, the pivot member 24 being received in slots 25 provided in the bifurcated end 26 of the short lever arm. All three connections permit swinging of the bent arm 16, responsive to changes in elevation of the float, to be transferred to the indicator arm, which is slid along the filling tube by such swinging, as the drawings indicate. The extremity of the indicator rod is preferably bored as indicated at 27 (Fig. 8) to receive a coil spring 28 whose end (preferably encased in a tubular cover or housing) engages the inside of the cap 12 when the latter is in place. Coil spring 28 cushions the shock of sudden changes in the level of the fuel, which changes occur when the tank is nearly empty and the vehicle is going around a curve or is traversing a rough road. As Fig. 2 shows, spring 28 may collapse when the fuel level drops below a certain point. When the filling cap is removed as in Fig. 3 the indicator rod pops out, a visual indication that the tank is empty or nearly so. In the dark, the position of the free end of the indicator rod may be easily determined by feeling in the mouth of the filling tube. When filling the tank, the operator can tell when the tank is nearly full by the position of the free end of the indicator rod.

What I claim is:

1. Fuel level gauging means comprising, in combination, a liquid fuel tank having a filling tube extending upwardly therefrom at an acute angle to the horizontal, said filling tube being normally closed at its outer end by a detachable cap; the tank having a top provided with an opening intermediate its ends; means sealing said opening; a gauge device swingably suspended from said sealing means and located wholly within the tank; said gauge device including an arm, a float mounted upon one end of the arm, and an indicator rod movably connected to the other end of the arm; the free end of said indicator rod being received in said filling tube and projecting beyond the opening of the filling tube when the liquid fuel level in the tank is low and the filling tube cap has been removed, the indicator rod being retracted within the filling tube by the action of the float on the gauge device when the tank is full.

2. Fuel level gauging means comprising, in combination, a liquid fuel tank having a filling tube extending upwardly therefrom at an acute angle to the horizontal, said filling tube being normally closed at its outer end by a detachable cap; the tank having a top provided with an opening intermediate its ends; a plate sealing said opening and having a gauge-supporting member secured to the underside thereof; a gauge device located wholly within the tank and having an angularly bent arm swingably suspended intermediate its ends from said gauge-supporting member; said gauge device also including a float swingably mounted upon one end of the bent arm, and a straight indicator rod movably connected at one end to the other end of the bent arm; said indicator rod having its free end received in said filling tube and projecting beyond the opening of the filling tube when the level of the liquid fuel in the tank is low and the filling tube cap has been removed; the free end of the indicator rod being substantially in contact with the inside of the filling tube cap when the tank is substantially full and the cap has been replaced.

3. The invention defined in claim 2, wherein the bent arm consists of a rigid rod providing a long lever arm and a short lever arm at right angles to the long lever arm, the point of suspension of the bent arm being at the outside of its right angle, so that both lever arms incline downwardly from said point of suspension, the float being connected with the long lever arm and the indicator rod being connected to the short lever arm.

4. The invention defined in claim 2, wherein the free end of the indicator rod includes a coil spring which is secured at one end to the indicator rod and extends normally outwardly in longitudinal alignment with said rod, said coil spring being otherwise free of attachment to any part so that it is longitudinally compressible and being of sufficient length so that it presses against the inside surface of the filling tube cap when the latter is in place.

References Cited in the file of this patent

UNITED STATES PATENTS

| | | |
|---|---|---|
| 937,748 | Alwood | Oct. 26, 1909 |
| 1,563,560 | Friedhoff | Dec. 1, 1925 |
| 2,377,330 | Dixon | June 5, 1945 |
| 2,604,522 | Monroe | July 22, 1952 |